A. O. HENDRICKS.
TWINE HOLDER.
APPLICATION FILED NOV. 1, 1911.
1,035,188.
Patented Aug. 13, 1912.
2 SHEETS—SHEET 1.
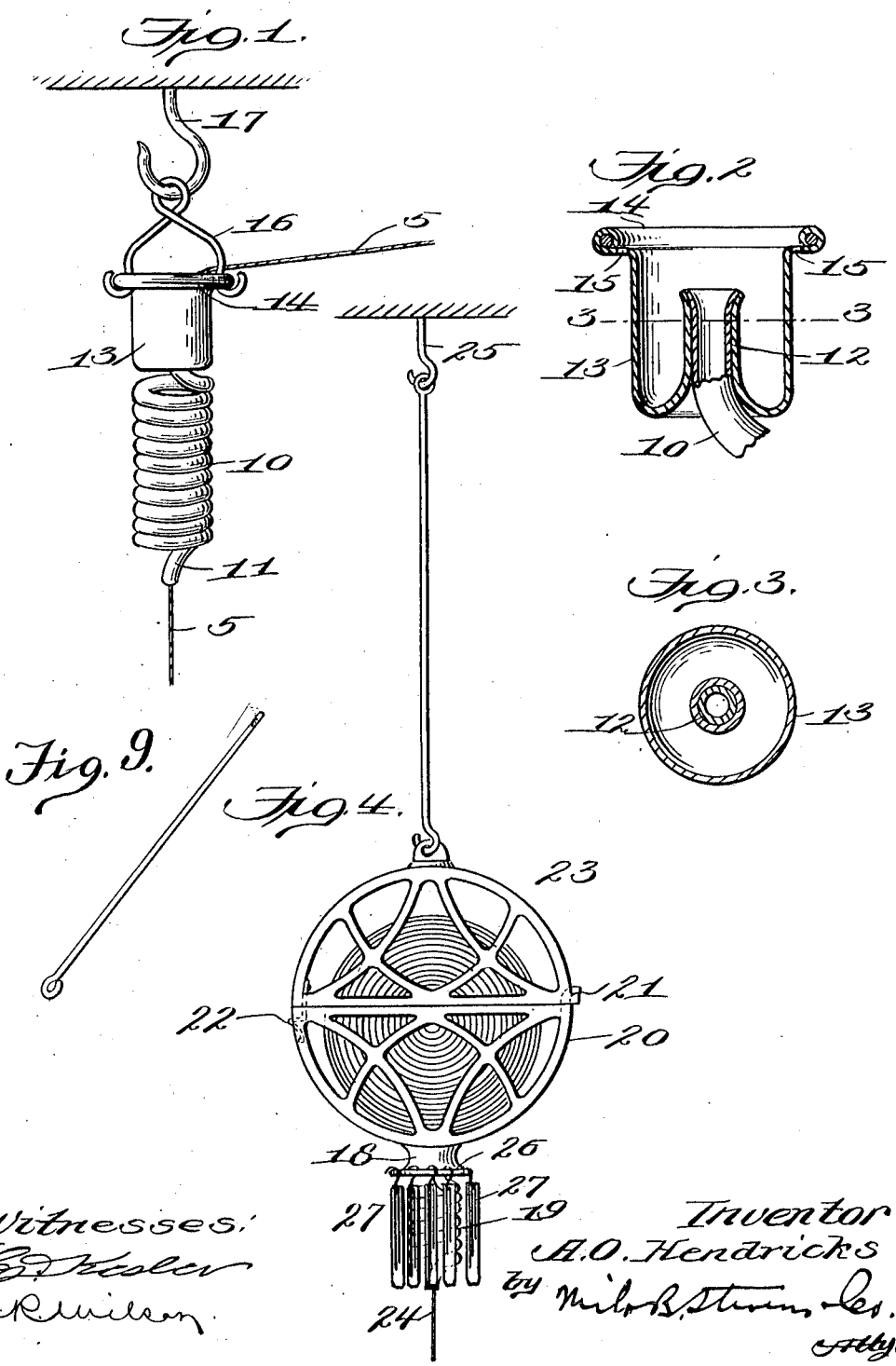
Witnesses:
Inventor
A. O. Hendricks
by Milo B. Stevens &co.
Att'ys

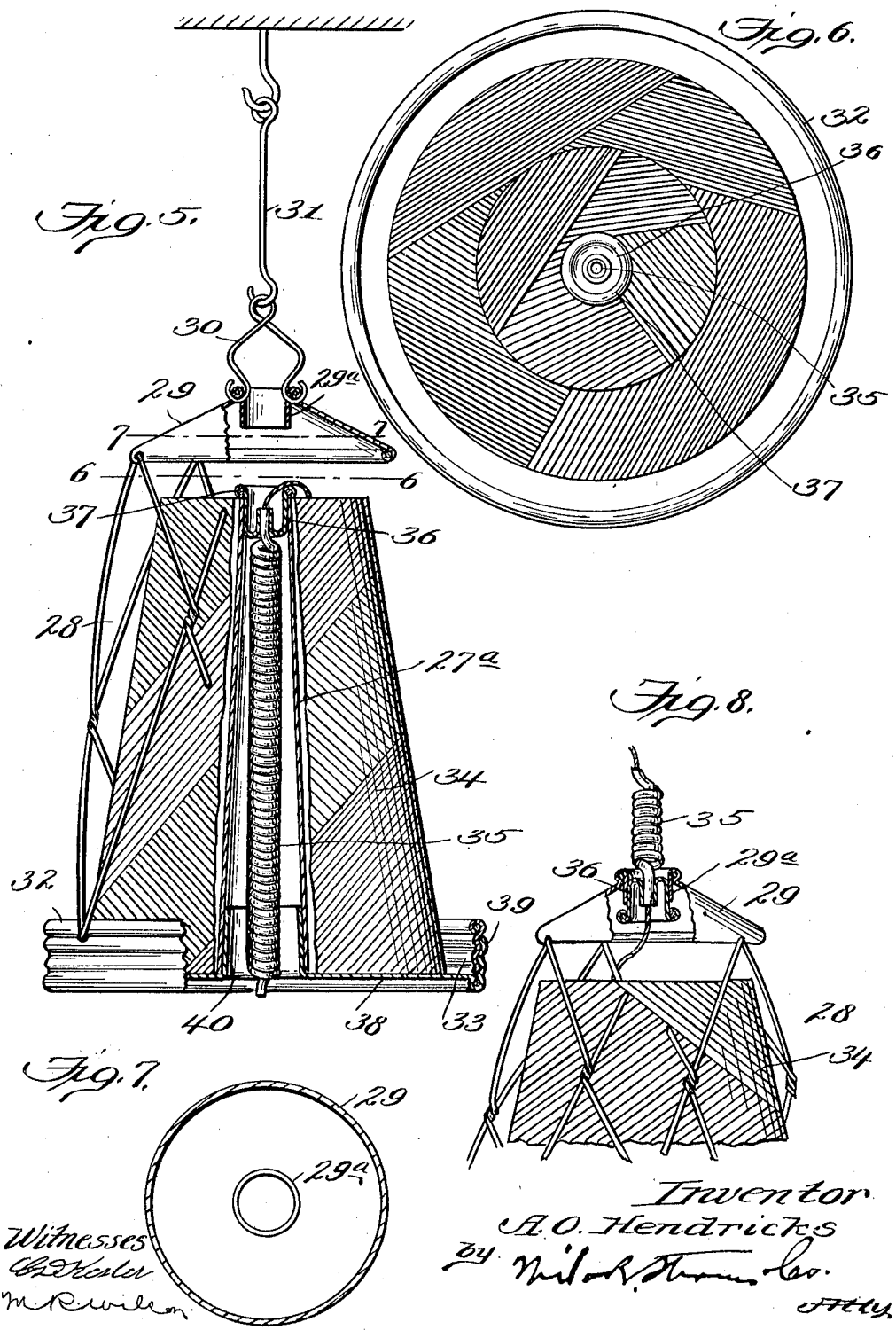

UNITED STATES PATENT OFFICE.

ALPHA O. HENDRICKS, OF ANTELOPE, MONTANA.

TWINE-HOLDER.

1,035,188.   Specification of Letters Patent.   Patented Aug. 13, 1912.

Application filed November 1, 1911. Serial No. 657,951.

*To all whom it may concern:*

Be it known that I, ALPHA O. HENDRICKS, a citizen of the United States, residing at Antelope, in the county of Valley and State of Montana, have invented certain new and useful Improvements in Twine-Holders, of which the following is a specification.

My present invention relates to twine holders for retail stores and the like, my object being to provide a holder of that character which will carry the twine out of the way when the same is severed, and which will do away with all weights, levers and other moving parts.

A further object of my invention is to provide a device of the above character which will be improved with respect to simplicity and durability and which will be extremely inexpensive.

Other objects, and the advantages, of my invention will be apparent from the following description, in which, Figure 1 is an elevation of my improved carrier complete for use where the supply of twine is from a removed point. Fig. 2 is an enlarged vertical section through the upper supporting cup thereof. Fig. 3 is a cross-section therethrough taken on the line 3—3 of Fig. 2. Fig. 4 is an elevation illustrating my improved carrier in connection with a holder for holding supplies of twine in the form of balls. Fig. 5 is a central vertical section through a device comprising my improved carrier in connection with a holder for holding supplies of twine in the form of frustums of cones having axial openings. Fig. 6 is a cross-section taken on the line 6—6 of Fig. 5. Fig. 7 is a similar view taken on the line 7—7 of Fig. 5.
Fig. 8 is an elevation of the upper portion of the holder shown in Figs. 5–7, illustrating the carrier in inverted postion, and Fig. 9 is a perspective view of a needle for threading the twine through the tubular spring.

As shown in Fig. 1, my device essentially comprises a tubular spring 10 which is wound to form a series of convolutions through which the twine 5 is threaded, one end 11 of this tube being free and the other end 12 being secured to a suitable support, as for instance within a cup 13 which may be provided with a rolled upper edge 14 having apertures 15 at diametrically opposite points for the reception of the extremities of a bail 16 by which the carrier as described so far, may be engaged with a hook 17 to hold it in suspended relation from a ceiling or the like. The device as described so far is thus complete for operation in connection with twine from a supply, for instance a ball, supported upon a shelf or other nearby and convenient point.

In order that my improved carrier may be used in connection with a holder for the twine, I may utilize the construction shown in Fig. 4, in which a cup 18, corresponding to the before-mentioned cup 13, supports the upper end of the tubular spring 19 and in turn has its upper end secured to cover an opening in the base of a spherical cage 20 in halves hinged at one point 21 provided with a diametrically opposed clasp 22, so that the cage may be opened to receive a ball of twine 23, the twine 24 from which is extended downwardly through the cup 18 and threaded through the tubular spring 19. The cage 20 is suspended from a suitable point by means of a hook 25, and in this construction the cup 18 may have a flange 26 around its lower edge and from which may be suspended glass, metal or other strips 27, forming a circular series of chimes.

The holding features of my invention are susceptible of various changes however, and such a structure as shown in Figs. 5, 6, and 7 may be employed to advantage in connection with twine wound around a hollow core 27$^a$ to form a frustum of a cone as is very common. To accommodate twine so wound, I provide a frusto-conical holder, the conical side 28 of which is formed of inter-connected and twisted wires threaded through the circular edge of a top plate 29 which may have a bail 30 adapted to engage a supporting hook 31. The lower edge of the body 28 is likewise secured to a wire rim 32 to which is suitably connected a circular strip 33 having threads. The lower end of this body is thus open to receive the frusto-conical twine package 34, downwardly through the axial opening of which the tubular spring 35 is extended, the cup 36 to which one end of said spring is fastened, having its upper flange 37 engage the upper end of the core 27$^a$ of the package to hold the carrier in place to receive the free end of the twine. The lower end of the holder may be closed by means of a base 38 having a circular threaded flange 39 to engage the strip 33 and provided with a central opening and a tubular member 40 secured to enter and project upwardly into the lower end of the core 27ª.

Thus it will be readily apparent that my invention provides a twine carrier singularly free from minute springs, weights, levers and in fact all complicated apparatus and parts likely to get out of order, and while the shape of my coiled carrier is plain, it should be understood that in order for it to operate properly and return quickly to its position of rest after it has been extended downwardly by pulling the free end of the cord, it should be carefully and moderately tempered in order to give it just the required amount of elasticity.

The top plate 29 of the holder shown in Figs. 5, 6, and 7, may have an inwardly depending cup 29ª which, with bail 30 removed, may receive the cup 36 of the carrier so as to support the carrier in inverted position as particularly shown in Fig. 8. In this case the holder will not be suspended but will rest upon a counter, shelf or other suitable support.

Fig. 9 illustrates a needle for threading the twine through the tubular spring. The supply of twine having been exhausted in the holder, the spring is drawn down to its full length, thereby straightening it, whereupon the needle is inserted from the bottom and threaded with the free end of the twine, after which the same is drawn through the spring and the new ball of twine is inserted in the holder.

I claim:

1. A twine carrier comprising a helical tension spring which is tubular to receive the twine therethrough, and means to secure one end of said spring.

2. A twine carrier comprising a helical tension spring which is tubular to receive the twine therethrough, a cup in which one end of said spring is secured, and means carried by the cup to support the spring.

3. A twine carrier comprising a helical tension spring which is tubular to receive the twine therethrough, a twine holder, and means supported in connection with said holder and to which one end of said spring is secured.

4. A twine carrier comprising a helical tension spring which is tubular to receive the twine therethrough, a twine holder, and a cup supported in connection with said holder and to which one end of said spring is secured.

In testimony whereof I affix my signature in presence of two witnesses.

ALPHA O. HENDRICKS.

Witnesses:
J. E. PORTER,
P. S. WILLOW.

Copies of this patent may be obtained for five cents each, by addressing the "Commissioner of Patents, Washington, D. C."